United States Patent
Dean et al.

(10) Patent No.: US 12,044,201 B1
(45) Date of Patent: Jul. 23, 2024

(54) ENERGY STORAGE AND ELECTRICITY GENERATING SYSTEM AND METHOD OF USE

(71) Applicants: David Dean, Montclair, CA (US); Steven Dean, Montclair, CA (US)

(72) Inventors: David Dean, Montclair, CA (US); Steven Dean, Montclair, CA (US)

( * ) Notice: Subject to any disclaimer, the term of this patent is extended or adjusted under 35 U.S.C. 154(b) by 0 days.

(21) Appl. No.: 18/133,851

(22) Filed: Apr. 12, 2023

(51) Int. Cl.
| | | |
|---|---|---|
| *H02K 7/18* | (2006.01) | |
| *F03B 13/08* | (2006.01) | |
| *F03B 13/18* | (2006.01) | |

(52) U.S. Cl.
CPC .......... *F03B 13/1885* (2013.01); *F03B 13/08* (2013.01); *H02K 7/1823* (2013.01); *F05B 2260/422* (2020.08)

(58) Field of Classification Search
CPC .............. F03B 13/08; F03B 13/1885; F05B 2260/422; H02K 7/1823
See application file for complete search history.

(56) References Cited

U.S. PATENT DOCUMENTS

| | | | | |
|---|---|---|---|---|
| 7,045,912 B2 * | 5/2006 | Leijon | ................. | F03B 13/1885 290/53 |
| 7,319,278 B2 * | 1/2008 | Gehring | .............. | F03B 13/1885 290/53 |
| 8,581,433 B2 * | 11/2013 | Sidenmark | .......... | F03B 13/1815 290/53 |
| 9,059,605 B2 * | 6/2015 | Murray | ............... | F03B 13/1885 |
| 10,605,226 B2 | 3/2020 | Shelson-Coulson | | |
| 10,781,787 B2 | 9/2020 | Hector, Jr. | | |
| 10,837,360 B2 | 11/2020 | Maier | | |
| 11,073,139 B2 | 7/2021 | Anteau | | |
| 2010/0107627 A1 * | 5/2010 | Morgan | .................. | B63B 35/44 114/294 |
| 2011/0089696 A1 * | 4/2011 | Davis | .................. | F03B 13/1865 290/53 |
| 2012/0091942 A1 * | 4/2012 | Jones | ........................ | F03G 7/05 320/101 |
| 2012/0112472 A1 * | 5/2012 | Murray | ............... | F03B 13/1845 290/1 R |
| 2012/0297759 A1 | 11/2012 | Chiu | | |
| 2015/0308401 A1 * | 10/2015 | Edwards | ................. | F03B 17/02 29/428 |
| 2020/0340442 A1 | 10/2020 | Gade | | |
| 2022/0010763 A1 | 1/2022 | Von Bargen | | |

FOREIGN PATENT DOCUMENTS

WO   WO2020036962   2/2020

\* cited by examiner

*Primary Examiner* — Tulsidas C Patel
*Assistant Examiner* — Thomas K Quigley

(57) ABSTRACT

An energy storage and electricity generating system for alternately storing energy and producing electricity includes a framework, which is positionable proximate to a surface of a body of water and to which a motor and a turbine are attached. A cable is operationally engaged to the motor by a pair of guide pulleys. A pair of tanks is attached singly to opposed ends of the cable, positioning the motor to selectively raise one of the tanks while the other is being lowered. Actuated valves and release valves on the tanks allow pressurized air to be selectively generated within the tanks and pressurized water to be forced from the tanks, respectively, as the tanks are lowered and raised. The water is forced through a hose onto blades of the turbine to generate an electrical current.

Figure 1:
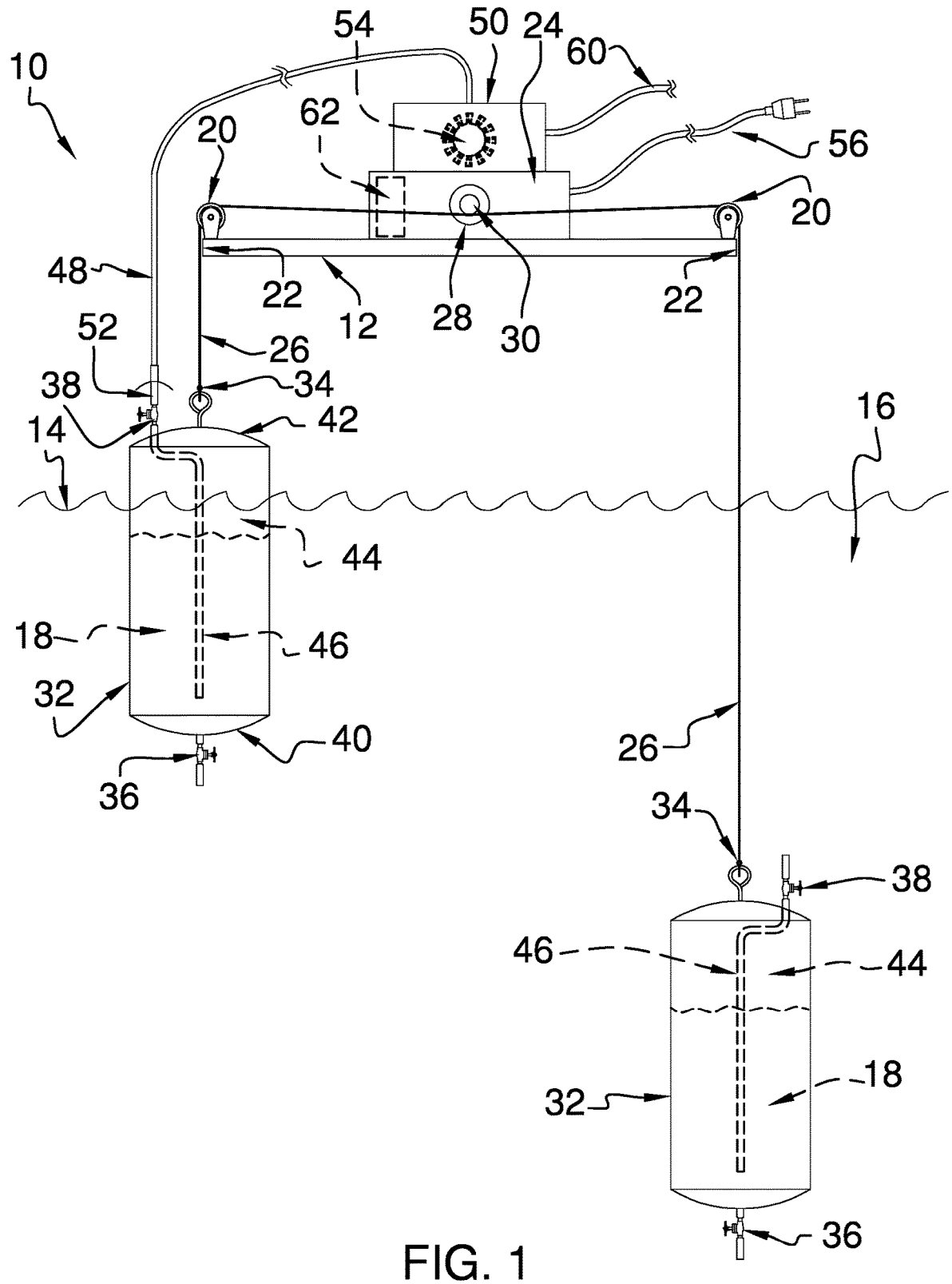

6 Claims, 5 Drawing Sheets

ENERGY STORAGE AND ELECTRICITY GENERATING SYSTEM AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to energy systems and more particularly pertains to a new energy system for alternately storing energy and producing electricity. The present invention discloses an energy system that utilizes pressurized air as a means of storing energy and which uses the pressurized air to force water into a turbine to generate electricity.

(2) Description of Related Art Including Information Disclosed Under 37 CFR 1.97 and 1.98

The prior art relates to energy systems, which may comprise wave engines, water powered turbines, systems using high pressure pumps to generate tanks of water under pressure, and pressure transmitters staged in deep water. What is lacking in the prior art is an energy system comprising a pair of tanks wherein one tank is lowered into a body of water while the other is raised, such that air in the lowered tank is pressurized. Upon being raised, the pressurized air can force water from the formerly lowered tank into a turbine to generate electricity.

BRIEF SUMMARY OF THE INVENTION

An embodiment of the disclosure meets the needs presented above by generally comprising a framework, which is configured to be positionable proximate to a surface of a body of water. A pair of guide pulleys is attached singly to opposing ends of the framework. A motor is attached to the framework substantially equally distant from the opposing ends. A cable is operationally engaged to the guide pulleys and to a drive pulley that is attached to a shaft of the motor. A pair of tanks is attached singly to opposed ends of the cable, positioning the motor to selectively raise one of the tanks while the other is being lowered. A pair of actuated valves and a pair of release valves are attached singly to a lower end and an upper end of each tank, respectively.

An actuated valve attached to a respective tank that is to be lowered into the body of water is selectively openable and thus is configured to allow entry of water to generate pressurized air adjacent to the upper end. The actuated valve is selectively closable and thus is configured to trap the pressurized air prior to the motor raising the tank. Each pipe of a pair of pipes extends from a release valve of a respective tank to proximate to the lower end of the respective tank. A hose is operationally engaged to and extends from a turbine, which is attached to the framework. A coupler is attached to the hose distal from the turbine and is configured to selectively attach to a respective release valve. The respective release valve is configured to be opened to allow the pressurized air to force water through the pipe and the hose onto blades of the turbine. The turbine thus is configured to generate an electrical current.

Another embodiment of the disclosure includes a method of storing energy and generating an electrical current comprising a provision step, which entails providing an energy storage and electricity generating system, according to the disclosure above. An installation step of the method is positioning the framework proximate to a surface of a body of water. Operational steps of the method are actuating the motor to lower one of the tanks into the body of water, actuating the actuated valve attached to the one tank to close the actuated valve, actuating the motor to raise the one tank to the surface, attaching the coupler to the release valve attached to the one tank, and opening the release valve. An output step of the method is allowing the turbine to generate an electrical current.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a front view of an energy storage and electricity generating system according to an embodiment of the disclosure.

Figure 2:
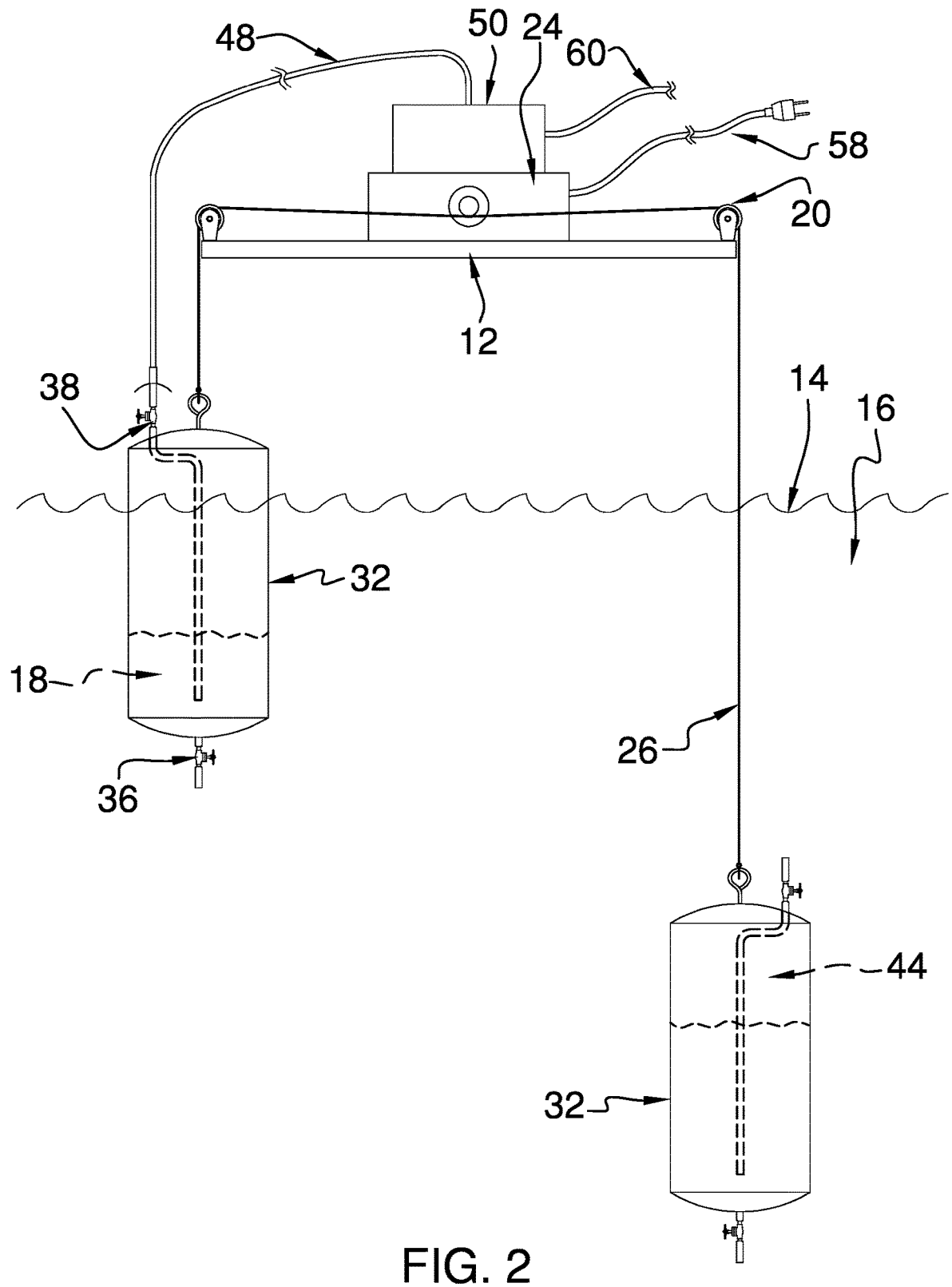
Figure 3:
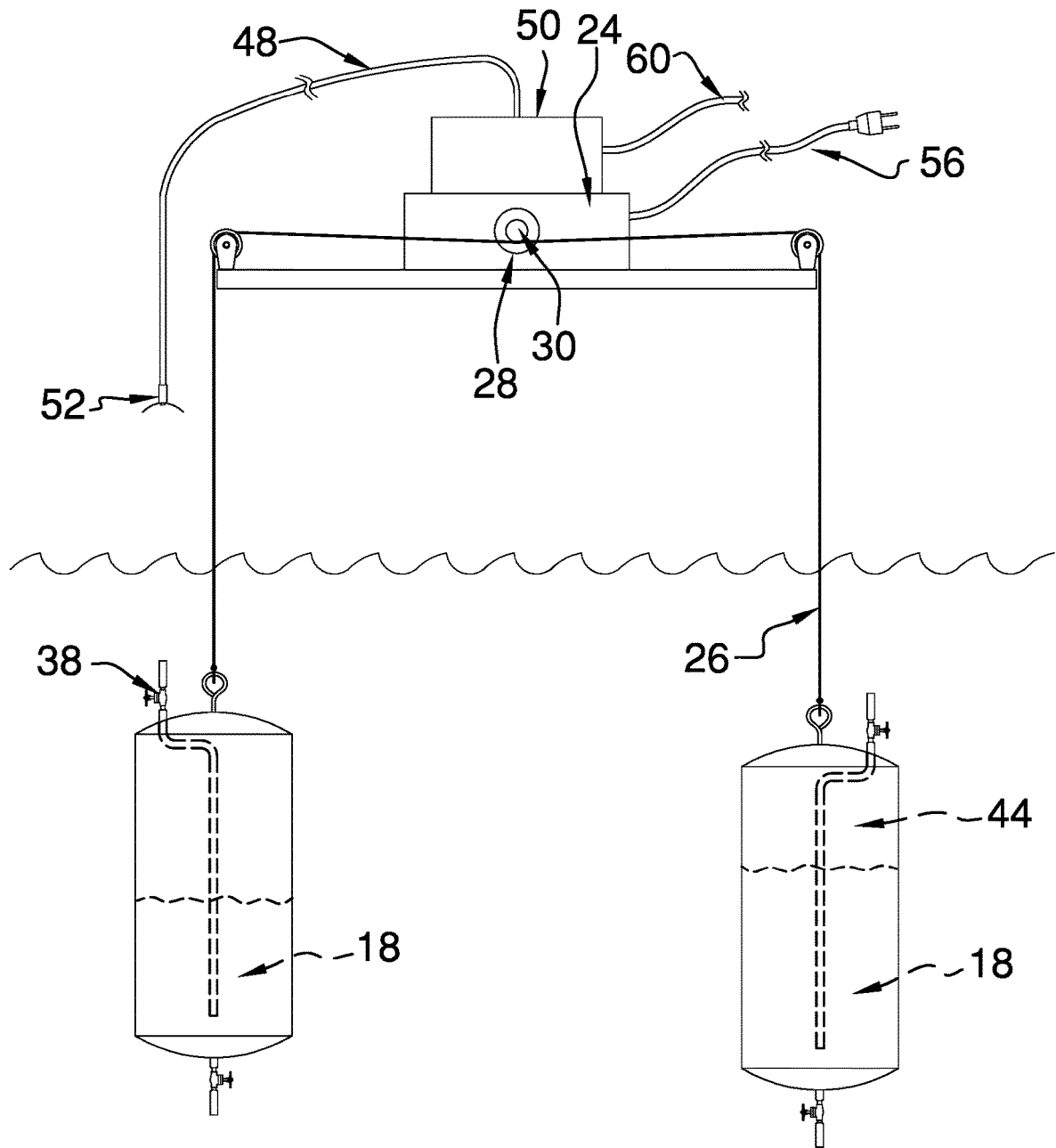
Figure 4:
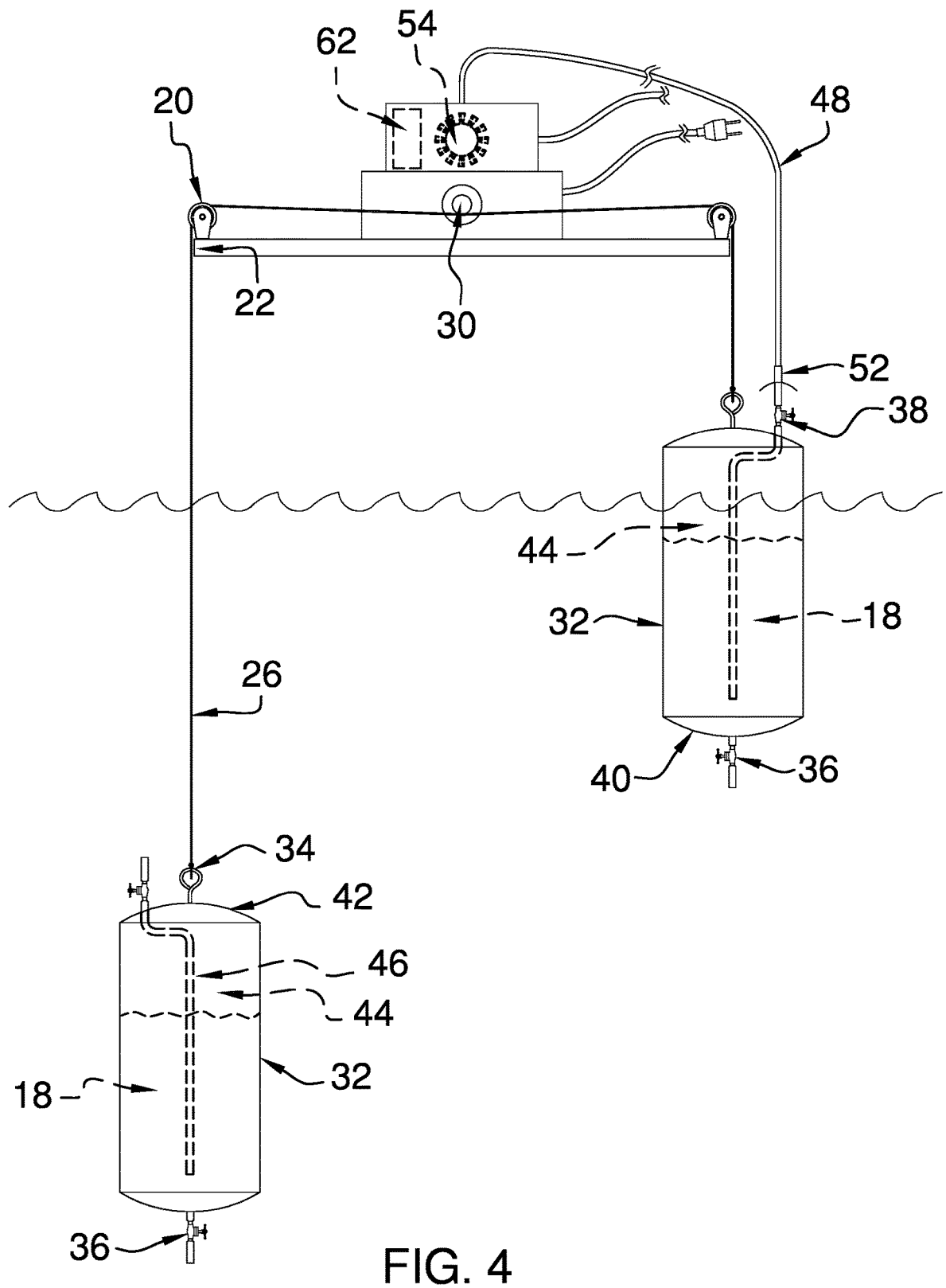
Figure 5:
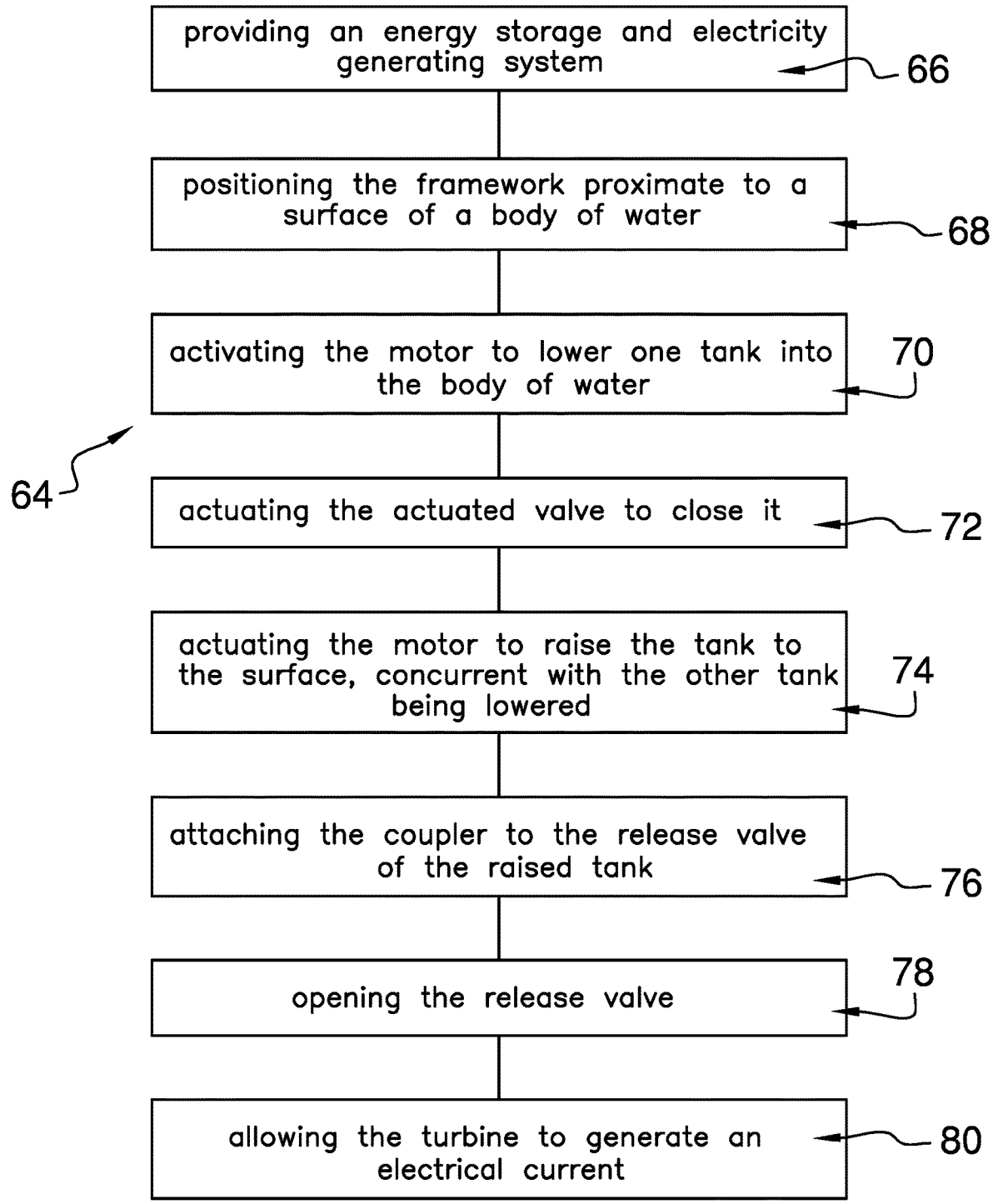

FIG. 2 is a front view of an embodiment of the disclosure.
FIG. 3 is a front view of an embodiment of the disclosure.
FIG. 4 is a front view of an embodiment of the disclosure.
FIG. 5 is a flow diagram for a method utilizing an embodiment of the disclosure.

DETAILED DESCRIPTION OF THE INVENTION

With reference now to the drawings, and in particular to FIGS. 1 through 5 thereof, a new energy system embodying the principles and concepts of an embodiment of the disclosure and generally designated by the reference numeral 10 will be described.

As best illustrated in FIGS. 1 through 5, the energy storage and electricity generating system 10 generally comprises a framework 12, which is configured to be positionable proximate to a surface 14 of a body 16 of water 18, such as a pond, lake, ocean, reservoir, or the like. The present invention anticipates the framework 12 being mountable to a vessel, to a base on a shoreline, or being inherently buoyant so that it floats.

The guide pulleys 20 of a pair of guide pulleys 20 are attached singly to opposing ends 22 of the framework 12. A motor 24 is attached to the framework 12 substantially equally distant from the opposing ends 22. A cable 26, chain, or the like is operationally engaged to the guide pulleys 20 and to a drive pulley 28 that is attached to a shaft 30 of the motor 24. A pair of tanks 32 is attached singly to opposed ends 34 of the cable 26, positioning the motor 24 to selectively raise one of the tanks 32 while the other is being lowered, as is shown in FIGS. 1-4.

The actuated valves 36 of a pair of actuated valves 36 and the release valves of a pair of release valves 38 are attached singly to a lower end 40 and to an upper end 42 of each tank 32, respectively. An actuated valve 36, which is attached to a respective tank 32 that is to be lowered into the body 16 of water 18, is selectively openable and thus is configured to allow entry of water 18 into the respective tank 32 to generate pressurized air 44 adjacent to the upper end 42. The actuated valve 36 is selectively closable and thus is configured to trap the pressurized air 44 prior to the motor 24 raising the respective tank 32.

Each pipe 46 of a pair of pipes 46 extends from a release valve 38 of a respective tank 32 to proximate to the lower end 40 of the respective tank 32. A hose 48 is operationally engaged to and extends from a turbine 50, which is attached to the framework 12. A coupler 52 is attached to the hose 48 distal from the turbine 50 and is configured to be selectively attached to a respective release valve 38. The respective release valve 38 is configured to be opened to allow the pressurized air 44 to force water 18 through the pipe 46 and the hose 48 onto blades 54 of the turbine 50. The turbine 50 thus is configured to generate an electrical current.

The present invention is anticipated to be useful in providing electricity in event of power failure and in providing a means of storing energy from intermittent power sources, such as solar arrays and windmills, for later use. As the energy storage and electricity generating system 10 cycles the tanks 32, as shown in FIGS. 1-4, the motor 24 efficiently lifts one tank 32 while lowering the other tank 32, with the amount of energy being required diminishing as the one tank 32 is raised and the other tank 32 takes on water 18.

A power module 56 is operationally engaged to the motor 24 and is enabled to selectively power the motor 24. The power module 56 may comprise a power cord 58, although the present invention also anticipates the motor 24 being battery powered. A power conduit 60, which is operationally engaged to and which extends from the turbine 50, is configured to conduct the electrical current to a load or to a power grid.

A controller 62 is attached to the framework 12 and is operationally engaged to the motor 24, the turbine 50, and the pair of actuated valves 36. The present invention also anticipates the release valves 38 being electronically actuated and operationally engaged to the controller 62. The actuated valves 36 and the release valves 38 then could be engaged to the controller 62 by means of a signal conduit (not shown) that is embedded within the cable 26, or other signaling means, such as transmitters.

The controller 62 is enabled to selectively actuate the motor 24, to raise and to lower the tanks 32, and the actuated valves 36, so that they are closed prior to raising and opened prior to lowering of the tank 32 to which they are attached. The controller 62 also is enabled to selectively actuate the turbine 50 after the coupler 52 has been attached to the release valve 38.

The energy storage and electricity generating system 10 shown in FIG. 1-4 represents a basic system having the minimal number of essential components. The present invention anticipates other systems including multiple pairs of tanks 32, each having an associated motor 24, and automation elements allowing the controller 62 to operate the energy storage and electricity generating system 10 semi-autonomously or completely autonomously, including automated coupling of the coupler 52 to the release valve 38, automated actuation of the release valve 38, and the like.

In use, the energy storage and electricity generating system 10 enables a method of storing energy and generating an electrical current 64. The method 64 comprises a provision step 66, which entails providing an energy storage and electricity generating system 10, according to the specification above. An installation step 68 of the method 64 is positioning the framework 12 proximate to a surface 14 of a body 16 of water 18. A first operational step 70 of the method 64 is actuating the motor 24 to lower one of the tanks 32 into the body 16 of water 18. A second operational step 72 of the method 64 is actuating the actuated valve 36 attached to the one tank 32 to close the actuated valve 36. A third operational step 74 of the method 64 is actuating the motor 24 to raise the one tank 32 to the surface 14, concurrent with the other tank 32 being lowered into the body 16 of water 18. A fourth operational step 76 of the method 64 is attaching the coupler 52 to the release valve 38 that is attached to the one tank 32. A fifth operational step 78 of the method 64 is opening the release valve 38. An output step 80 of the method 64 is allowing the turbine 50 to generate an electrical current.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An energy storage and electricity generating system comprising:
- a framework configured to be positionable proximate to a surface of a body of water;
- a pair of guide pulleys attached singly to opposing ends of the framework;
- a motor attached to the framework substantially equally distant from the opposing ends;
- a drive pulley attached to a shaft of the motor;
- a cable operationally engaged to the pair of guide pulleys and the drive pulley;
- a pair of tanks attached singly to opposed ends of the cable, such that the motor is positioned for selectively raising one of the tanks of the pair of tanks as the other of the tanks of the pair of tanks is being lowered;
- a pair of actuated valves attached singly to a lower end of each tank of the pair of tanks, such that an actuated valve of the pair of actuated valves attached to a respective tank of the pair of tanks that is to be lowered into the body of water is selectively openable, wherein the actuated valve is configured for allowing entry of water for generating pressurized air adjacent to the upper end, and such that the actuated valve of the pair of actuated valves is selectively closable, wherein the actuated valve is configured for trapping the pressurized air prior to the motor raising the respective tank of the pair of tanks;
- a pair of release valves attached singly to an upper end of each tank of the pair of tanks;
- a pair of pipes, each pipe extending from a release valve of a respective tank of the pair of tanks to proximate to the lower end of the respective tank of the pair of tanks;
- a turbine attached to the framework;
- a hose operationally engaged to and extending from the turbine; and
- a coupler attached to the hose distal from the turbine and being configured for selectively attaching to a respective release valve of the pair of release valves, wherein the respective release valve of the pair of release valves is configured for being opened for allowing the pressurized air to force water through the pipe and the hose onto blades of the turbine, wherein the turbine is configured for generating an electrical current.

2. The energy storage and electricity generating system of claim 1, further including a power module operationally engaged to the motor, such that the power module is enabled for selectively powering the motor.

3. The energy storage and electricity generating system of claim 2, wherein the power module comprises a power cord.

4. The energy storage and electricity generating system of claim 1, further including a power conduit operationally engaged to and extending from the turbine, wherein the power conduit is configured for conducting the electrical current to a load or a power grid.

5. An energy storage and electricity generating system comprising:
- a framework configured to be positionable proximate to a surface of a body of water;
- a pair of guide pulleys attached singly to opposing ends of the framework;
- a motor attached to the framework substantially equally distant from the opposing ends;
- a drive pulley attached to a shaft of the motor;
- a cable operationally engaged to the pair of guide pulleys and the drive pulley;
- a pair of tanks attached singly to opposed ends of the cable, such that the motor is positioned for selectively raising one of the tanks of the pair of tanks as the other of the tanks of the pair of tanks is being lowered;
- a pair of actuated valves attached singly to a lower end of each tank of the pair of tanks, such that an actuated valve of the pair of actuated valves attached to a respective tank of the pair of tanks that is to be lowered into the body of water is selectively openable, wherein the actuated valve is configured for allowing entry of water for generating pressurized air adjacent to the upper end, and such that the actuated valve of the pair of actuated valves is selectively closable, wherein the actuated valve is configured for trapping the pressurized air prior to the motor raising the respective tank of the pair of tanks;
- a pair of release valves attached singly to an upper end of each tank of the pair of tanks;
- a pair of pipes, each pipe extending from a release valve of a respective tank of the pair of tanks to proximate to the lower end of the respective tank of the pair of tanks;
- a turbine attached to the framework;
- a hose operationally engaged to and extending from the turbine; and
- a coupler attached to the hose distal from the turbine and being configured for selectively attaching to a respective release valve of the pair of release valves, wherein the respective release valve of the pair of release valves is configured for being opened for allowing the pressurized air to force water through the pipe and the hose onto blades of the turbine, wherein the turbine is configured for generating an electrical current;
- a power module operationally engaged to the motor, such that the power module is enabled for selectively powering the motor, the power module comprising a power cord;
- a power conduit operationally engaged to and extending from the turbine, wherein the power conduit is configured for conducting the electrical current to a load or a power grid; and
- a controller attached to the framework and operationally engaged to the motor, the turbine, and the pair of actuated valves.

6. A method of storing energy and generating an electrical current comprising the steps of:
- providing an energy storage and electricity generating system comprising:
  - a framework configured to be positionable proximate to a surface of a body of water;
  - a pair of guide pulleys attached singly to opposing ends of the framework;
  - a motor attached to the framework substantially equally distant from the opposing ends;
  - a drive pulley attached to a shaft of the motor;
  - a cable operationally engaged to the pair of guide pulleys and the drive pulley;
  - a pair of tanks attached singly to opposed ends of the cable, such that the motor is positioned for selectively raising one of the tanks of the pair of tanks as the other of the tanks of the pair of tanks is being lowered;
  - a pair of actuated valves attached singly to a lower end of each tank of the pair of tanks, such that an actuated valve of the pair of actuated valves attached to a respective tank of the pair of tanks that is to be lowered into the body of water is selectively openable, wherein the actuated valve is configured for allowing entry of water for generating pressurized air adjacent to the upper end, and such that the actuated valve of the pair of actuated valves is selectively closable, wherein the actuated valve is configured for trapping the pressurized air prior to the motor raising the respective tank of the pair of tanks;

a pair of release valves attached singly to an upper end of each tank of the pair of tanks;

a pair of pipes, each pipe extending from a release valve of a respective tank of the pair of tanks to proximate to the lower end of the respective tank of the pair of tanks;

a turbine attached to the framework;

a hose operationally engaged to and extending from the turbine; and a coupler attached to the hose distal from the turbine and being configured for selectively attaching to a respective release valve of the pair of release valves, wherein the respective release valve of the pair of release valves is configured for being opened for allowing the pressurized air to force water through the pipe and the hose onto blades of the turbine, wherein the turbine is configured for generating an electrical current;

positioning the framework proximate to a surface of a body of water;

actuating the motor to lower one of the tanks of the pair of tanks into the body of water;

actuating the actuated valve attached to the one of the tanks of the pair of tanks to close the actuated valve;

actuating the motor to raise the one of the tanks of the pair of tanks to the surface;

attaching the coupler to the release valve attached to the one of the tanks of the pair of tanks;

opening the release valve; and allowing the turbine to generate an electrical current.

* * * * *